United States Patent
Tsai

(10) Patent No.: US 11,038,260 B2
(45) Date of Patent: Jun. 15, 2021

(54) TUNABLE CAPACITORS TO CONTROL ANTENNA RADIATION PATTERN

(71) Applicant: Hewlett-Packard Development Company, L.P., Spring, TX (US)

(72) Inventor: Ming-Shien Tsai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/608,822

(22) PCT Filed: Apr. 24, 2017

(86) PCT No.: PCT/US2017/029043
§ 371 (c)(1),
(2) Date: Oct. 26, 2019

(87) PCT Pub. No.: WO2018/199876
PCT Pub. Date: Nov. 1, 2018

(65) Prior Publication Data
US 2020/0203810 A1  Jun. 25, 2020

(51) Int. Cl.
*H01Q 1/24* (2006.01)
*H01Q 9/04* (2006.01)

(52) U.S. Cl.
CPC ............ *H01Q 1/245* (2013.01); *H01Q 1/243* (2013.01); *H01Q 9/0421* (2013.01)

(58) Field of Classification Search
CPC ........... H01Q 1/243; H01Q 1/245; H01Q 9/42
See application file for complete search history.

(56) References Cited

U.S. PATENT DOCUMENTS

| | | | |
|---|---|---|---|
| 8,326,385 B2 | 12/2012 | Brogle et al. | |
| 8,432,320 B2 | 4/2013 | Jagielski et al. | |
| 9,160,074 B2 | 10/2015 | Desclos et al. | |
| 9,490,885 B1 * | 11/2016 | Zheng | H04W 52/42 |
| 9,502,750 B2 | 11/2016 | Yarga et al. | |
| 9,532,322 B2 | 12/2016 | Yu et al. | |
| 2004/0214621 A1 | 10/2004 | Ponce De Leon et al. | |
| 2013/0217342 A1 | 8/2013 | Abdul-Gaffoor et al. | |
| 2013/0328723 A1 | 12/2013 | Rappaport | |
| 2014/0015719 A1 | 1/2014 | Ramachandran | |

(Continued)

FOREIGN PATENT DOCUMENTS

| | | |
|---|---|---|
| CN | 103428314 | 12/2013 |
| CN | 105576350 | 5/2016 |
| WO | WO-2015157087 A1 | 10/2015 |

OTHER PUBLICATIONS

Chen, P. et al., a Compact LTE Antenna Design for Mobile Device with Full Metal Housing, Jan. 15, 2016, < http://sci-hub.cc/10.1109/iwat.2016.7434790 >.

(Continued)

*Primary Examiner* — Md K Talukder
(74) *Attorney, Agent, or Firm* — HPI Patent Department

(57) ABSTRACT

In one example, a communication device is disclosed, which includes a metal casing, an antenna, a tunable capacitor connected between the antenna and the metal casing, and a control unit. The control unit may determine proximity of a user to the communication device. Further, the control unit may adjust the tunable capacitor to control radiation pattern of the antenna based on the determined proximity.

14 Claims, 4 Drawing Sheets

(56) References Cited

U.S. PATENT DOCUMENTS

| | | |
|---|---|---|
| 2014/0071008 A1 | 3/2014 | Desclos et al. |
| 2014/0087786 A1 | 3/2014 | Tani et al. |
| 2014/0118190 A1 | 5/2014 | Mendolia |
| 2014/0162566 A1* | 6/2014 | Desclos ............... H04B 7/0871 455/67.13 |
| 2015/0050832 A1* | 2/2015 | Chiang .............. H01R 13/6581 439/527 |
| 2016/0099501 A1* | 4/2016 | Rowson ................ H01Q 1/243 343/833 |
| 2017/0018841 A1* | 1/2017 | Parkhurst ............ H01Q 9/0421 |
| 2017/0084989 A1* | 3/2017 | Shi ........................ H01Q 1/243 |
| 2017/0358838 A1* | 12/2017 | Huang ..................... H01Q 9/14 |
| 2018/0129355 A1* | 5/2018 | Lynn ...................... G06F 3/043 |
| 2018/0277963 A1* | 9/2018 | Desclos ................ H01Q 21/29 |
| 2020/0203810 A1* | 6/2020 | Tsai ..................... H04B 1/3838 |

OTHER PUBLICATIONS

Wu, C-Y. et al., Low-profile Tunable Wwan Antenna for Wholemetal-covered Mobile Phone Applications, Dec. 2-5, 2014, < http://sci-hub.cc/10.1109/isanp.2014.7026637 >.

* cited by examiner

TUNABLE CAPACITORS TO CONTROL ANTENNA RADIATION PATTERN

BACKGROUND

Wireless communication devices, such as mobile phones, tablets, and the like, may utilize a metal casing for fashion appearance. The metal housing may also provide stiffness, strength, a thinner thickness, recyclable, heat radiation and so on. Such wireless communication devices may rely on antenna technology to radiate radio frequency (RF) signals for transmission as well as to gather RF broadcast signals for reception.

BRIEF DESCRIPTION OF THE DRAWINGS

Examples are described in the following detailed description and in reference to the drawings, in which.

DETAILED DESCRIPTION

Wireless communication devices, such as mobile phones, tablets, and the like, may include a casing to house components. Example casing may be fabricated from a variety of materials, such as, metal, plastic, and the like. Communication devices may use a metal casing for fashion appearance. Further, metal casing may provide stiffness, strength, thinner thickness, recyclable, heat radiation and so on.

For establishing RF communication, a communication device may use antennas (e.g., internal antennas) that are disposed inside the metal casing. Each antenna may have a radiation pattern which indicates strength of the electromagnetic waves as a function of angle and position corresponding to antenna boresight. When the antenna is in use, antenna regions and/or conductive regions of the metal casing in the vicinity of the antenna may be subjected to electromagnetic waves. In this case, the use of the internal antennas in the metal casing may significantly increase Specific Absorption Rate (SAR) level of the communication device. Used herein, the term "SAR" may refer to a numerical value that indicate the degree of harmful influence on a human body caused by electromagnetic waves radiated from the antenna.

Further, total load capacitance of the antenna may be changed since the part of the human body forms a capacitance load to the antenna, which causes the antenna's resonance frequency to deviate from a pre-determined operating resonance frequency. Thus, the antenna's efficiency and performance may be reduced significantly.

Examples described herein may provide a communication device to dynamically control radiation pattern of antennas. The communication device may include a metal casing, an antenna, a tunable capacitor connected between the antenna and the metal casing, and a control unit. The control unit may determine proximity of a user to the communication device and adjust the tunable capacitor to control radiation pattern of the antenna based on the determined proximity.

Examples described herein may direct the radiation pattern away from the body of the user while maintaining the total radiated power ("TRP") of the communication devices such that there is no loss in communication ability or quality. Further, examples described herein may enhance the SAR protection level of the communication devices without degrading the radiation efficiency of the antennas.

Figure 1A:
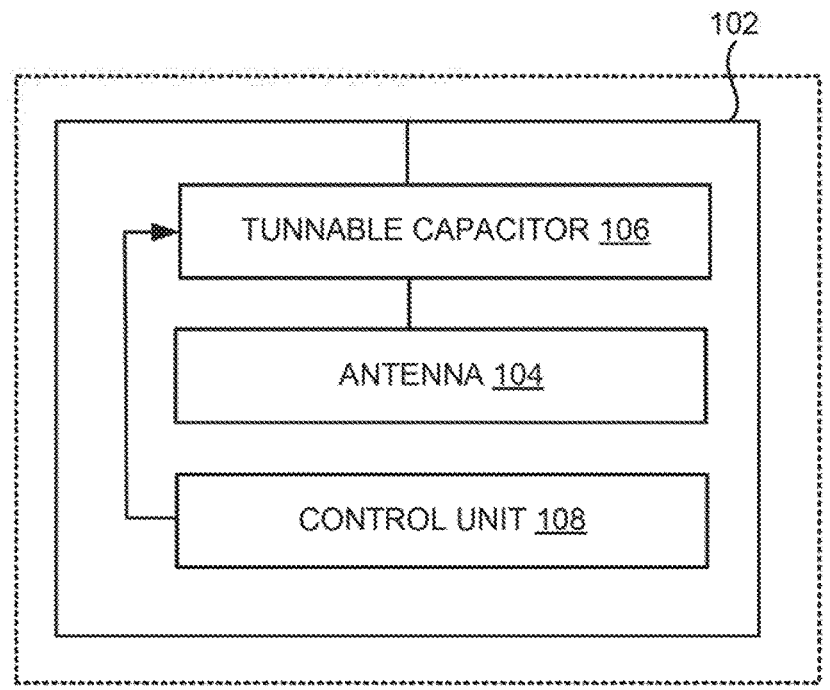
FIG. 1A is a block diagram of an example communication device including a control unit to control antenna radiation pattern.

Turning now to figures, FIG. 1A is a block diagram of an example communication device 100. Example communication device 100 may include a mobile phone, a tablet, a personal digital assistant (PDA), a convertible/detachable device, and the like. Convertible devices and detachable devices may refer to devices that can be configured in either a laptop mode or a tablet mode.

As shown in FIG. 1A, communication device 100 may include an antenna 104, a tunable capacitor 106, and a control unit 108 that are housed in a metal casing 102. Example metal casing 102 can also house multiple other components such as processor, memory, a battery, a communication module, and/or additional components. For example, antenna 104 may be a windowless antenna that may support multiple frequency bands such as Global System for Mobile communications (GSM) bands, Universal Mobile Telecommunications System (UMTS) bands, Long Term Evolution (LTE) bands, Wireless Wide Area Network (WWAN) bands, and the like.

Tunable capacitor 106 may be connected between antenna 104 and metal casing 102. In one example, tunable capacitor 106 may be connected between antenna 104 and a side wall of metal casing 102. Further, tunable capacitor 106 may function as an adaptive stub to electrically couple or decouple metal casing 102 and antenna 104. The use of tunable capacitor 106 may enable the side wall of metal casing 102 to function as a radiating plane of antenna 104. Example tunable capacitor 106 may be a tunable RF capacitor, a digitally tunable capacitor, a Micro-Electro-Mechanical System (MEMS) variable capacitor, and the like.

During operation, control unit 108 may determine proximity of a user to communication device 100. In one example, proximity of the user to communication device 100 may be determined using a proximity sensor (e.g., a grip sensor). Example proximity sensor may generate sensing signals that indicate the access distance of the user corresponding to communication device 100. In this case, control unit 108 may determine the user's proximity to communication device 100 based on a threshold value. Example threshold value may be distance of the user from communication device 100, at which the user may realize an acceptable SAR level.

Further, control unit 108 may adjust tunable capacitor 106 to control radiation pattern of antenna 104 based on the determined proximity. When the proximity of the user to communication device 100 is less than the threshold value, control unit 108 may adjust tunable capacitor 106 to a first capacitance value to direct the radiation pattern away from the side wall of metal casing 102. In this case, a hot spot of SAR may be away from the side wall at which the user is holding communication device 100. In another example, when the proximity of the user to communication device 100 is not less than the threshold value, control unit 108 may adjust tunable capacitor 106 to a second capacitance value to direct the radiation pattern towards the side wall. In one example, the first capacitance value is less than the second capacitance value.

Figure 1B:
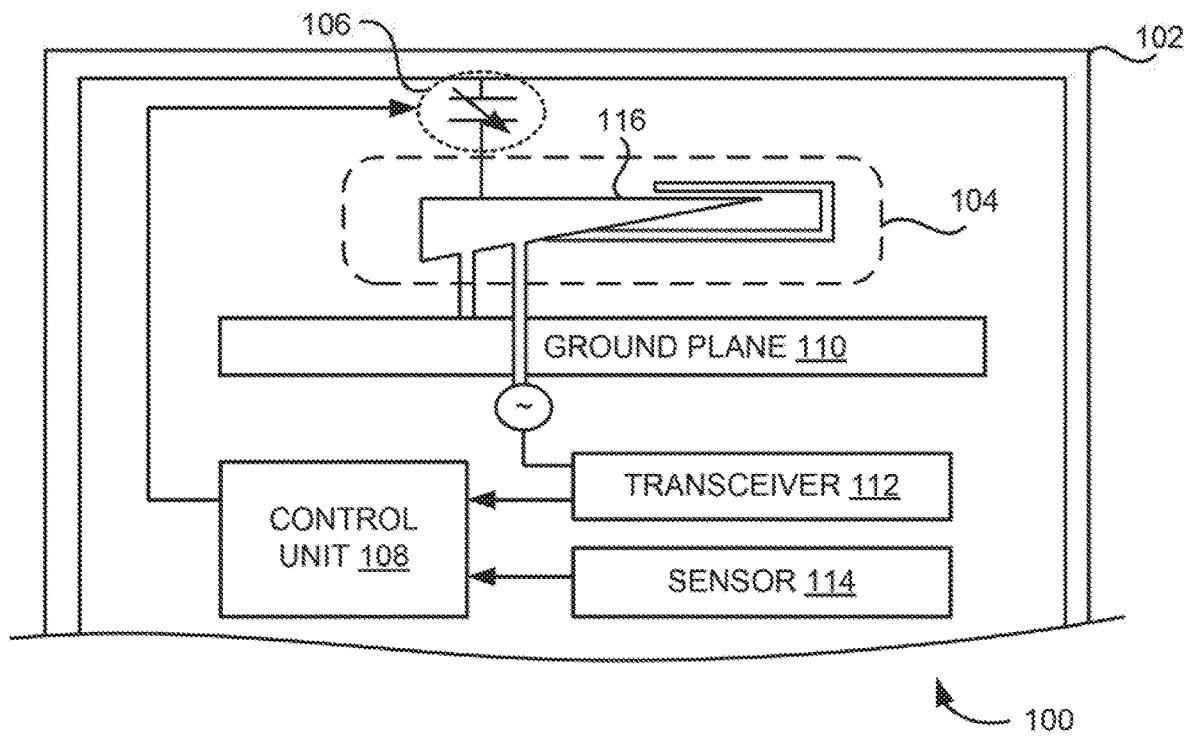
FIG. 1B is a schematic top view of the example communication device as shown in FIG. 1, including additional components.

FIG. 1B is a schematic top view of communication device 100 of FIG. 1, including additional components. Additional components may include a ground plane 110, a transceiver 112, and a sensor 114. As shown in FIG. 1B, transceiver 112 may enable a selection of a frequency band at which signals to be transmitted and/or received via antenna 104. Further, antenna 104 may include a radiator 116 that may be electrically coupled to a signal path of transceiver 112. Example antenna 104 may be a multiple-band antenna that relies on characteristics modes to operate in different frequency bands. In each characteristics mode, antenna 104 may provide a different radiation pattern corresponding to an operational frequency of antenna 104.

Further, antenna 104 may be mounted on ground plane 110 and radiator 116 may be connected to ground plane 110. During operation, radiator 116 may radiate electromagnetic wave in a radiation pattern that corresponds to operational frequency of antenna 104. In one example, a ground plane 110 may be at least partially disposed in a coplanar relationship to radiator 116, to serve as a reflecting surface for antenna radiation.

Further, control unit 108 may receive the frequency selection data from transceiver 112 and also receive sensor data from sensor 114 (e.g., a proximity sensor). Example sensor data may indicate whether the user is holding the side wall of metal casing 102 in vicinity of antenna region. Furthermore, control unit 108 may tune tunable capacitor 106 to control radiation pattern of antenna 104 based on the determined proximity and frequency selection data.

Figure 2:
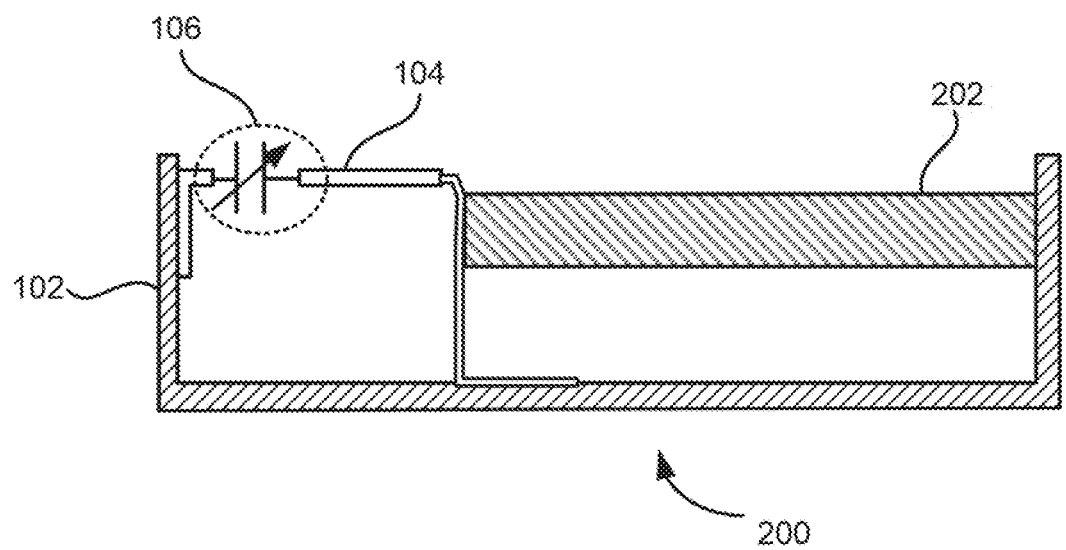
FIG. 2 is a cross sectional side view of the example communication device having a tunable capacitor connected between a metal casing and an antenna.

FIG. 2 is a cross sectional side view 200 of communication device 100 having tunable capacitor 106 connected between the side wall of metal casing 102 and antenna 104. Example tunable capacitor 106 may be a tunable diode that may include a capacitance value in a range of 1 pF to 10 pF. In one example, tunable capacitor 106 may be tuned to control radiation pattern of antenna 104 either in a direction towards the side wall of metal casing 102 or towards a display panel 202. This is explained in detail in FIG. 3A and FIG. 3B.

Figure 3A:
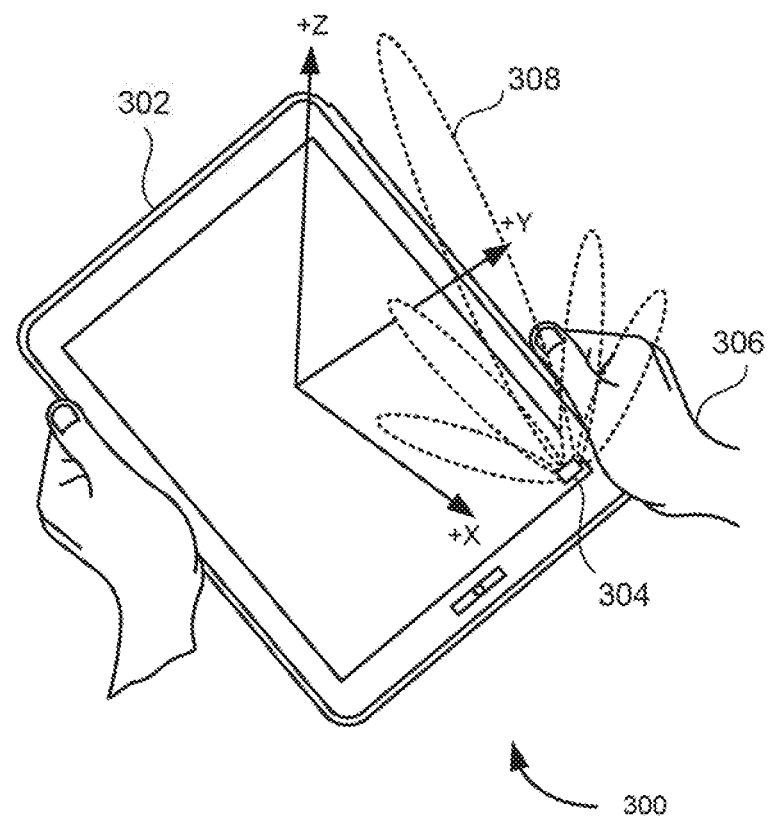
FIG. 3A is a schematic diagram of a communication device illustrating an example radiation pattern of an antenna when user's hand is holding a side wall of a metal casing in a vicinity of the antenna region.

FIG. 3A is a schematic diagram of communication device 300 illustrating an example radiation pattern 308 of antenna 304 when user's hand 306 is holding the side wall of metal casing 302. As shown in FIG. 3A, when the user is holding the side wall of metal casing 302 in vicinity of antenna region (e.g., 304), control unit (e.g., 108) may adjust the tunable capacitor (e.g., 106) to a first capacitance value (i.e., less than 2.7 pF). Tunable capacitor operating in the first capacitance value may suppress the flow of surface current between antenna 304 and the side wall of metal casing 302. In this case, the side wall of the metal casing 302 may be electrically isolated from antenna 304. The radiation pattern 308 may be directed away from the side wall of metal casing 302 and towards a display panel of communication device 300, and hence may reduce the RF energy coupling from antenna 304 to the side wall. In this example, the amount of radiation directed towards the user's hand from communication device 300 may be substantially reduced, which may reduce the SAR level significantly without affecting the antenna radiation efficiency and performance.

Figure 3B:
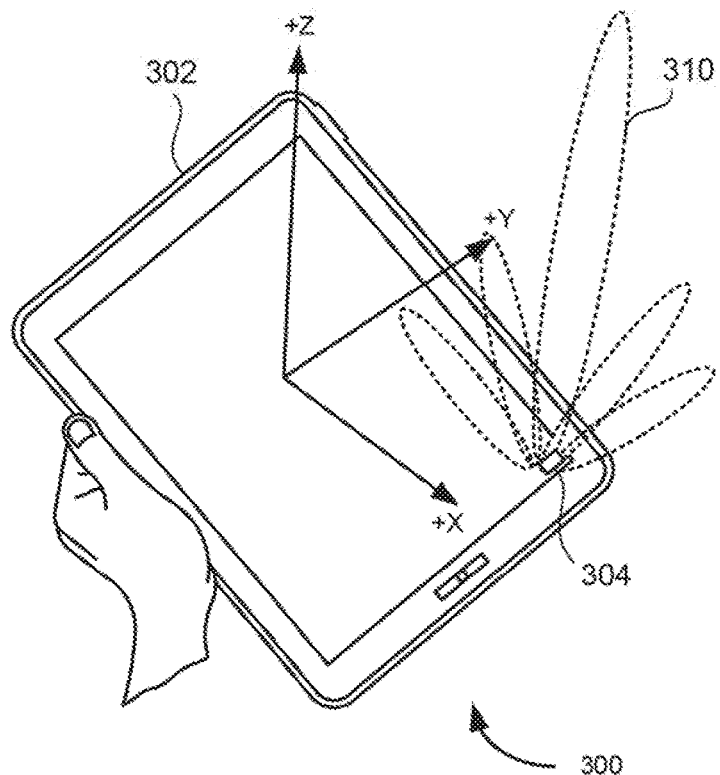
FIG. 3B is a schematic diagram of the communication device illustrating an example radiation pattern of the antenna when the user's hand is away from the side wall of the metal casing in the vicinity of the antenna region.

FIG. 3B is a schematic diagram of communication device 300 illustrating an example radiation pattern of communication device 300 of antenna 304 when user's hand is away from the side wall of metal casing 302. As shown in FIG. 3B, when the user is not holding the side wall of metal casing 302 in the vicinity of antenna region, control unit may adjust the tunable capacitor to a second capacitance value (i.e., more than 5 pF). Tunable capacitor operating in the second capacitance value may enable the flow of surface current between antenna 304 and the side wall of metal casing 302. In this case, the side wall of metal casing 302 may function as antenna's radiating plane, and may couple at least 50 percentage of RF energy from antenna 304 to the side wall. Thereby, radiation pattern 310 may be directed towards the side wall of metal casing 302, which may significantly increase the antenna's radiation efficiency.

In some other example, a plurality of antennas may be arrayed in metal casing 302, to combine radiation patterns and radiation powers of the antennas. In this case, radiation patterns of at least one antenna may be dynamically controlled in a same way as described in the aforementioned example. In one example, control unit 108 may variably set the first capacitance value and the second capacitance value based on characteristics mode of antenna and frequency bands of operation.

Control unit 108 may include, for example, hardware devices including electronic circuitry for implementing the functionality described herein. In addition or as an alternative, control unit 108 may be implemented as a series of instructions encoded on a machine-readable storage medium of communication device (e.g., 100, 300) and executable by processor. In examples described herein, the processor may include, for example, one processor or multiple processors included in a single device or distributed across multiple devices. It should be noted that, in some examples, some modules are implemented as hardware devices, while other modules are implemented as executable instructions.

Figure 4:
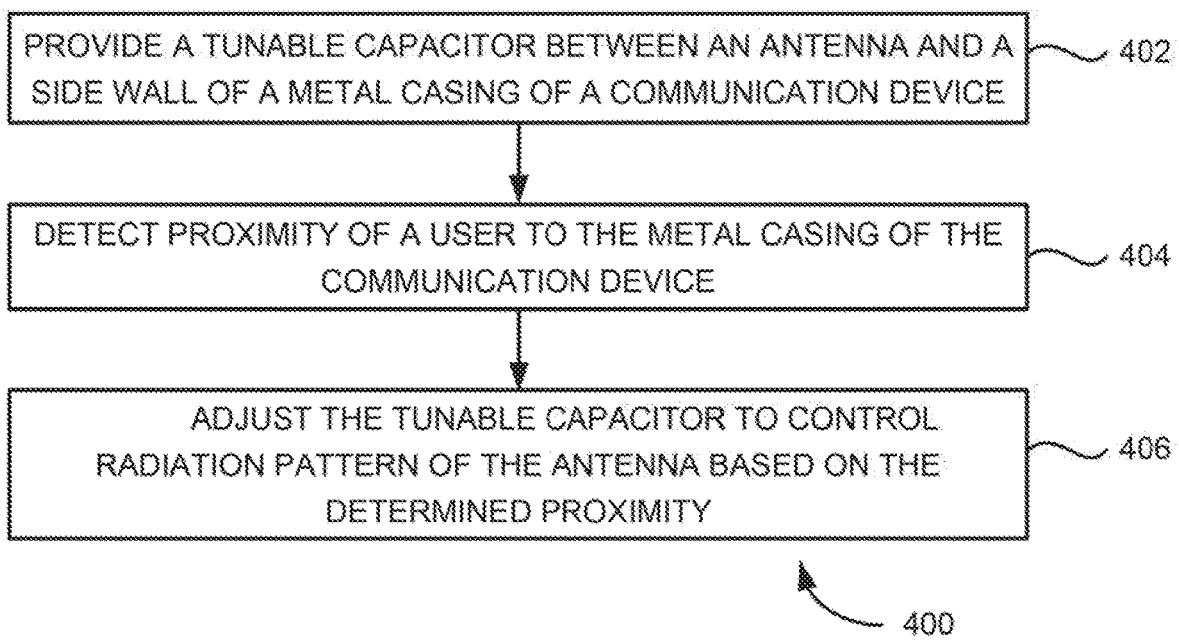
FIG. 4 depicts an example flow chart for controlling antenna radiation pattern.

FIG. 4 depicts an example flow chart 400 for controlling antenna radiation pattern. It should be understood that the process depicted in FIG. 4 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate software, or use a combination of hardware and software to perform the illustrated processes.

At 402, a tunable capacitor may be provided between an antenna and a side wall of a metal casing of a communication device. At 404, proximity of a user to the metal casing of the communication device may be detected. In one example, the proximity of the user to the metal casing may be determined using a proximity sensor disposed in the communication device.

At 406, the tunable capacitor may be adjusted to control radiation pattern of the antenna based on the determined proximity. In one example, the tunable capacitor may be tuned to a first capacitance value to direct the radiation pattern away from the side wall and towards a display panel of the communication device when the proximity of the user to the metal casing is less than a threshold value. In another example, the tunable capacitor may be tuned to a second capacitance value to direct the radiation pattern towards the side wall when the proximity of the user to the metal casing is not less then the threshold value. When the tunable capacitor is in the second capacitance value, the side wall of the metal casing may be enabled to function as a radiating plane of the antenna. For example, the first capacitance value may be less than the second capacitance value.

Figure 5:
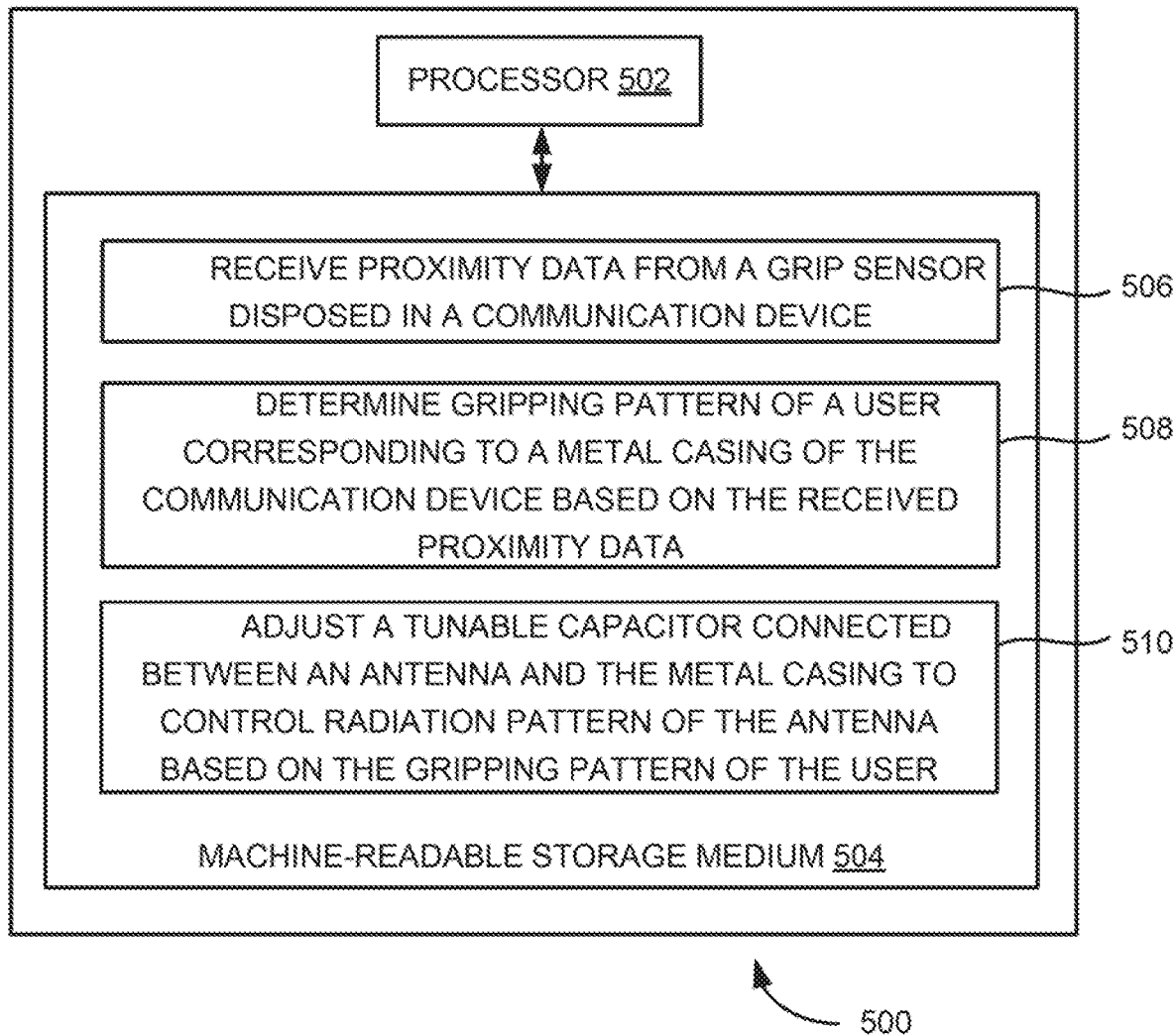
FIG. 5 depicts an example block diagram of a computing device showing a non-transitory computer-readable medium having instructions to control antenna radiation pattern.

FIG. 5 depicts a block diagram of a computing device 500 to control antenna radiation pattern. Computing device 500 may include a processor 502 and a machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 504 may be remote but accessible to computing device 500.

Machine-readable storage medium 504 may store instructions 506-510. In an example, instructions 506-510 may be executed by processor 502 to control radiation pattern of antenna. Instructions 506 may be executed by processor 502 to receive proximity data from a grip sensor disposed in a communication device. In one example, multiple grip sensors may be disposed at side walls of metal casing. Multiple grip sensors may generate different sensing signals for different forms of user grip and sends the generated sensing signals to the control unit.

Instructions 508 may be executed by processor 502 to determine gripping pattern of a user corresponding to a metal casing of the communication device based on the received proximity data. Example gripping patterns may include a user's hand grip on the mobile terminal with the left hand, the right hand, and/or with both hands.

Instructions 510 may be executed by processor 502 to adjust a tunable capacitor connected between an antenna and the metal casing to control radiation pattern of the antenna based on the gripping pattern of the user. Example tunable capacitor may be connected between the antenna and a side wall of the metal casing.

In one example, the tunable capacitor may be tuned to a first capacitance value to direct the radiation pattern away from the side wall of the metal casing when the gripping pattern of the user matches a predetermined pattern. The predetermined pattern may be a pattern that indicates user's hand grip near antenna region and/or side wall of metal casing region on the mobile terminal. In another example, the tunable capacitor may be tuned to a second capacitance value to direct the radiation pattern towards the side wall when the gripping pattern of the user does not match the predetermined pattern. Example first capacitance value may be less than the second capacitance value.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have." and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A communication device, comprising:
    a display panel;
    a metal casing;
    an antenna including a radiator;
    a ground plane connected to the radiator and disposed in a coplanar relationship to the radiator to serve as a reflecting surface for antenna radiation;
    a tunable capacitor connected between the antenna and a sidewall of the metal casing; and
    a control unit to:
        determine proximity of a user to the communication device; and
        adjust the tunable capacitor to control a radiation pattern of the antenna via the radiator based on the determined proximity such that the radiator is to direct the radiation pattern towards the display panel when the tunable capacitor has a first capacitance value and the radiator is to direct the radiation pattern is towards the sidewall when the tunable capacitor has a second capacitance value.

2. The communication device of claim 1, wherein:
    when the proximity of the user to the communication device is less than a threshold value, the control unit is to adjust the tunable capacitor to the first capacitance value to direct the radiation pattern away from the side wall of the metal casing and towards the display panel.

3. The communication device of claim 2, wherein:
    when the proximity of the user to the communication device is not less than the threshold value, the control unit is to adjust the tunable capacitor to the second capacitance value to direct the radiation pattern towards the side wall, and wherein the first capacitance value is less than the second capacitance value.

4. The communication device of claim 1, wherein the side wall of the metal casing is to function as a radiating plane of the antenna.

5. The communication device of claim 1, wherein the tunable capacitor comprises a capacitance value in a range of 1 pF to 10 pF.

6. The communication device of claim 1, wherein the control unit is to: determine proximity of the user to the communication device using a proximity sensor.

7. A method, comprising:
providing a tunable capacitor between an antenna and a side wall of a metal casing of a communication device, wherein the antenna includes a radiator disposed in a coplanar relationship with a ground plane of the communication device to act as a reflecting surface for antenna radiation;
detecting proximity of a user to the metal casing of the communication device; and
adjusting the tunable capacitor to control radiation pattern of the antenna based on the determined proximity, wherein the radiation pattern is towards a display of the communication device when the tunable capacitor has a first capacitance value, and wherein the radiation pattern is towards the sidewall when the tunable capacitor has a second capacitance value.

8. The method of claim 7, wherein adjusting the tunable capacitor comprises:
tuning the tunable capacitor to the first capacitance value to direct the radiation pattern away from the side wall and towards the display panel of the communication device when the proximity of the user to the metal casing is less than a threshold value.

9. The method of claim 8, wherein adjusting the tunable capacitor comprises:
tuning the tunable capacitor to a second capacitance value to direct the radiation pattern towards the side wall when the proximity of the user to the metal casing is not less then the threshold value, the second capacitance value is to enable the side wall of the metal casing to function as a radiating plane of the antenna, and wherein the first capacitance value is less than the second capacitance value.

10. The method of claim 9, wherein the proximity of the user to the metal casing is determined using a proximity sensor disposed in the communication device.

11. A non-transitory computer-readable storage medium comprising instructions that, when executed by a processor, cause the processor to:
receive proximity data from a grip sensor disposed in a communication device;
determine gripping pattern of a user corresponding to a metal casing of the communication device based on the received proximity data; and
adjust a tunable capacitor connected between an antenna and a sidewall of the metal casing to control radiation pattern of the antenna based on the gripping pattern of the user, wherein:
the antenna includes a radiator disposed in a coplanar relationship with a ground plane of the communication device to act as a reflecting surface for antenna radiation;
the radiation pattern is towards a display of the communication device when the tunable capacitor has a first capacitance value; and
the radiation pattern is towards the sidewall when the tunable capacitor has a second capacitance value.

12. The non-transitory computer-readable storage medium of claim 11, wherein the side wall of the metal casing is to function as radiating plane of the antenna.

13. The non-transitory computer-readable storage medium of claim 12, wherein adjusting the tunable capacitor comprises:
tuning the tunable capacitor to the first capacitance value to direct the radiation pattern away from the side wall of the metal casing when the gripping pattern of the user matches a predetermined pattern.

14. The non-transitory computer-readable storage medium of claim 13, wherein adjusting the tunable capacitor comprises:
tuning the tunable capacitor to the second capacitance value to direct the radiation pattern towards the side wall when the gripping pattern of the user does not match the predetermined pattern, wherein the first capacitance value is less than the second capacitance value.

* * * * *